US012792677B2

(12) United States Patent
Yap et al.

(10) Patent No.: US 12,792,677 B2
(45) Date of Patent: Nov. 10, 2026

(54) LLM-BASED RECOMMENDER SYSTEM

(71) Applicant: SAP SE, Walldorf (DE)

(72) Inventors: Benjamin Yan Han Yap, Singapore (SG); Keng Boon Ang, Singapore (SG); Karen Yen Thong Tan, Singapore (SG); En Zhi Tan, Singapore (SG); Jia Xiang Lim, Singapore (SG); Benjamin Jin Boon Tan, Singapore (SG); Lenald Ng, Singapore (SG); Jie Xiang Yap, Singapore (SG); Rana Saha, Singapore (SG); Sai Mun Lee, Singapore (SG); Pern Piao Calvin Soh, Singapore (SG); Steven Peng Chen Fu, Singapore (SG); Abhijeet Bhanjadeo, Singapore (SG)

(73) Assignee: SAP SE, Walldorf (DE)

( * ) Notice: Subject to any disclaimer, the term of this patent is extended or adjusted under 35 U.S.C. 154(b) by 189 days.

(21) Appl. No.: 18/787,460

(22) Filed: Jul. 29, 2024

(65) Prior Publication Data

US 2026/0030304 A1 Jan. 29, 2026

(51) Int. Cl.
*G06F 16/9535* (2019.01)
*G06F 16/31* (2019.01)

(52) U.S. Cl.
CPC ........ *G06F 16/9535* (2019.01); *G06F 16/322* (2019.01)

(58) Field of Classification Search
CPC ........................... G06F 16/9535; G06F 16/322
USPC ........................................................ 707/732
See application file for complete search history.

(56) References Cited

U.S. PATENT DOCUMENTS

2011/0320498 A1* 12/2011 Flor ........................ G06F 16/28 707/E17.087
2024/0177204 A1* 5/2024 Ibañez ............... G06Q 30/0283
2024/0330579 A1* 10/2024 Saxena ................. G06F 40/106
2024/0395159 A1* 11/2024 Chang ..................... G06F 40/30
2024/0403658 A1* 12/2024 Rigterink ............... G06N 5/022
2025/0086214 A1* 3/2025 Panwar ................... G06F 40/56
2025/0086405 A1* 3/2025 Mishra ..................... G06N 3/08

OTHER PUBLICATIONS

"Gpt-4 technical report", OpenAI ArXiv, abs 2303.08774, [Online]. Retrieved from the Internet: https: arxiv.org abs 2303.08774., (2023), 100 pgs.

(Continued)

*Primary Examiner* — Kuen S Lu
(74) *Attorney, Agent, or Firm* — SCHWEGMAN LUNDBERG & WOESSNER, P.A.

(57) ABSTRACT

A three-stage pipeline is used to create a data structure for efficiently producing grounded recommendations that guarantee that the recommended items are part of a set, D. In the first stage, each item in D is converted into a vector representation. In the second stage, a hierarchical clustering method is used to build a tree based on the vector representations. Each item is a leaf node of the tree. Each non-leaf node represents a group of items or a group of groups of items, and so on. In the third stage, an LLM is used to generate text that encapsulates the information of the group (or groups) of items represented by each node. The generated tree is recursively traversed to generate recommendations.

20 Claims, 12 Drawing Sheets

(56) References Cited

OTHER PUBLICATIONS

Burke, Robin, "Hybrid recommender systems: survey and experiments", User modeling and user-adapted interaction 12, 331-370, (2002), 30 pgs.
Dai, Sunhao, "Uncovering ChatGPT's capabilities in recommender systems", In Proceedings of the 17th ACM Conference on Recommender Systems, RecSys 2023 ACM, [Online]. Retrieved from the Internet: http: dx.doi.org 10.1145 3604915.3610646., (2023), 8 pgs.
Ekstrand, M. D, "Collaborative filtering recommender systems", Foundations and Trends in Human-Computer Interaction, 4(2), (2011), 81-173.
Felfernig, A., "Basic approaches in recommendation systems", Recommendation Systems in Software Engineering, (2014), 15-37.
Geng, S., "Recommendation as language processing (rlp): a unified pretrain, personalized prompt and predict paradigm (p5).", In Proceedings of the 16th ACM Conference on Recommender Systems 299-315, [Online]. Retrieved from the Internet: https: doi.org 10.1145 3523227.3546767., (2022), 19 pgs.
Goldberg, D., "Using Collaborative Filtering to Weave an Information Tapestry", Communications of the ACM, 35 (12), (1992), 61-70 pgs.
Ji, J., "Genrec: large language model for generative recommendation", arXiv: 2307.00457 [cs.IR], (2023).
Kang, W. C, "Self-attentive sequential recommendation", In ICDM, IEEE Computer Society, (2018), 197-206.
Li, X., "A preliminary study of chatgpt on news recommendation: personalization, provider fairness, fake news", arXiv: 2306.10702 [cs.IR]., (2023), 6 pgs.
Liu, J., "Is chatgpt a good recommender? a preliminary study", arXiv: 2304.10149 [cs.IR], (2023), 10 pgs.
Liu, P., "Pre-train, prompt and recommendation: a comprehensive survey of language modelling paradigm adaptations in recommender systems", arXiv: 2302.03735 [cs.IR]., (2023), 18 pgs.
Nguyen, L. V, "Content-based collaborative filtering using word embedding: A case study on movie recommendation", In Proceedings of the International Conference on Research in Adaptive and Convergent Systems, 96-100, [Online]. Retrieved from the Internet: https: doi.org 10.1145 3400286.3418253., (2020), 5 pgs.
Song, K., "Mpnet: masked and permuted pre-training for language understanding", In Proceedings of the 34th International Conference on Neural Information Processing Systems, (2020), 14 pgs.
Sun, F., "Bert4rec: sequential recommendation with bidirectional encoder representations from transformer", In Proceedings of the 28th ACM International Conference on Information and Knowledge Management, CIKM '19, Beijing, China. Association for Computing Machinery, isbn: 9781450369763. 1441-1450, [Online]. Retrieved from the Internet: https: doi.org 10.1145 3357384.3357895., (2019), 11 pgs.
Sun, W., "Is ChatGPT good at search? investigating large language models as re-ranking agents", In H. Bouamor, J. Pino, and K. Bali, editors Proceedings of the 2023 Conference on Empirical Methods in Natural Language Processing Singapore. Association for Computational Linguistics, Online]. Retrieved from the Internet: https: aclanthology.org 2023.emnlp-main.923., 14918-14937.

* cited by examiner

LLM-BASED RECOMMENDER SYSTEM

TECHNICAL FIELD

The subject matter disclosed herein generally relates to recommender systems, and more specifically, to a large language model (LLM)-based recommender system.

BACKGROUND

Recommendation systems are widely used in many industries to personalize content that is consumed by end users. A typical recommendation system is trained using historical user interaction data. LLMs may be used even when there is a lack of historical user interaction data by providing a prompt that provides some information about the user.

LLMs use probabilistic methods to create coherent responses, sometimes going beyond the training data. This can result in "LLM hallucination," producing misleading or incorrect information, which can be useful for creative tasks like storytelling but problematic in accuracy-critical areas like research or specific domain recommendations. In recommender systems, LLM hallucinations can lead to suggestions of irrelevant data assets or promote non-existent or misleading ones, diverging from user preferences and past behavior.

DETAILED DESCRIPTION

Example methods and systems are directed to improving search for items in data sets using an LLM-based recommender system. There are several issues that prevent LLMs from being used in practical settings. Since LLMs are essentially free-text generators, it is very possible that the recommended items are not in the set of items to be recommended. To avoid this, an LLM may be accessed multiple times. For example, the LLM may accept a fixed maximum length prompt. A prompt may include a list of valid recommendations, but a complete list may be longer than the maximum length. Accordingly, a subset of the valid options may be presented in each prompt and multiple prompts used to get the LLM to consider all options. The more times the LLM is accessed, the greater the latency before a recommendation is provided.

As discussed herein, a three-stage pipeline is used to create a data structure for efficiently producing grounded recommendations that guarantee that the recommended items are part of a set, D. In the first stage, each item in D is converted into a vector representation. In the second stage, a hierarchical clustering method is used to build a tree based on the vector representations. Each item is a leaf node of the tree. Each non-leaf node represents a group of items or a group of groups of items, and so on. In the third stage, an LLM is used to generate text that encapsulates the information of the group (or groups) of items represented by each node.

A user query, q, may comprise a description of user preferences, past interactions by the user, text provided by the user, or any suitable combination thereof. The generated tree is recursively traversed to generate recommendations. For each level in the tree, the LLM is asked to sort nodes at that level by their summaries, in the order of how likely the node contains items that respond to q. The node with the highest likelihood is chosen as the next node to explore for the next level. This process is repeated until a leaf node, with an actual item from D, is reached. The item corresponding to the leaf node is recommended.

By using the systems and methods herein, a computing system serving the purpose of a recommendation system is improved. Typical natural language searches using LLMs have a significant risk of hallucination, which is addressed by the disclosed system, improving the value of search results. By contrast with recommendation systems that do not use LLMs, the ability to handle natural-language queries and process diverse data sets is substantially improved.

Figure 1:
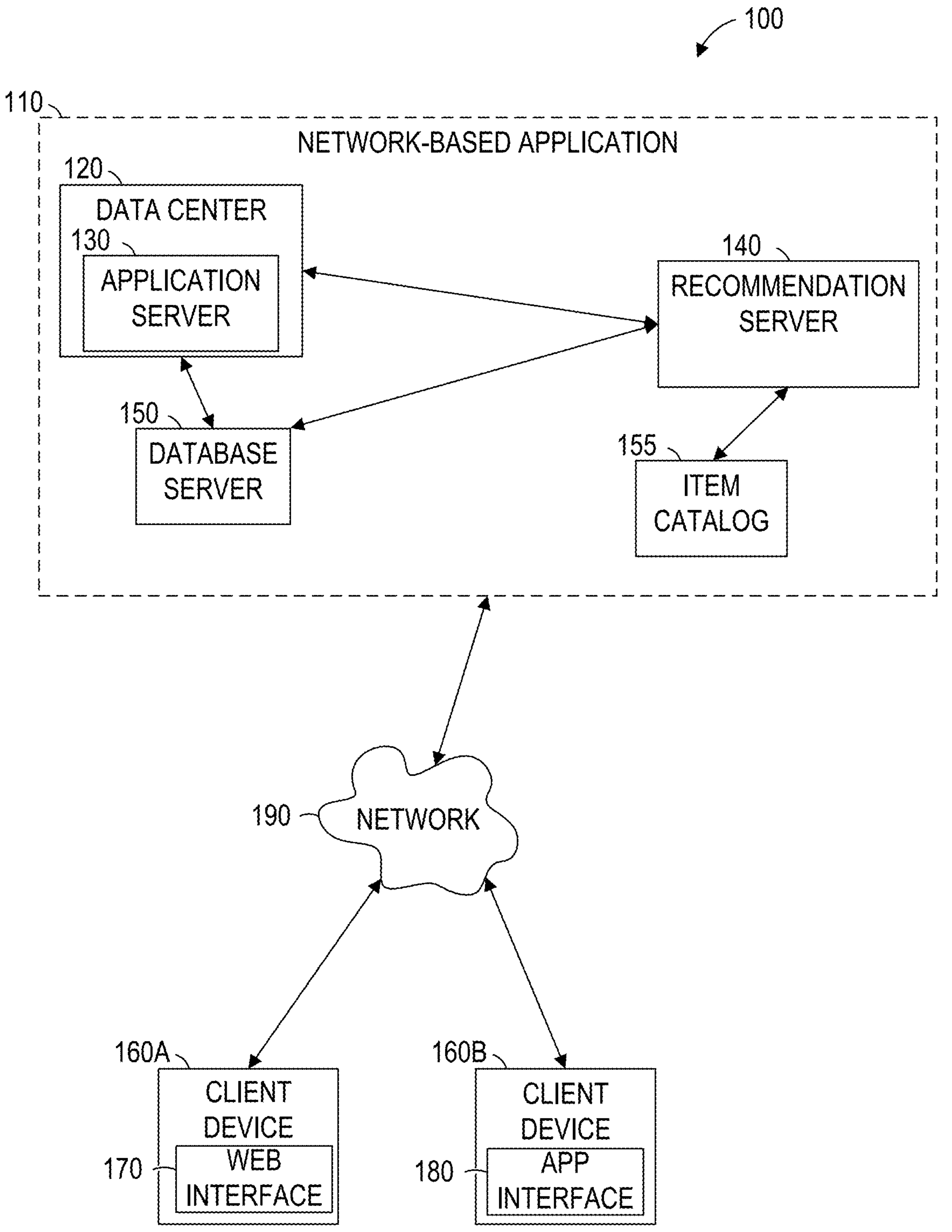
FIG. 1 shows a network diagram illustrating an example network environment suitable for providing an LLM-based recommender system.

FIG. 1 shows a network diagram illustrating an example network environment 100 suitable for providing an LLM-based recommender system. The network environment 100 includes a network-based application 110, client devices 160A and 160B, and a network 190. The network-based application 110 is implemented at a data center 120 comprising an application server 130 in communication with a database server 150. A recommendation server 140 may be accessed by users of the client devices 160A-160B to provide recommendations for items with metadata stored at the database server 150 or the item catalog 155. The items may be used by the application server 130. For example, if the items are movies, the application server 130 may stream the movies to the client devices 160A-160B. As another example, the items may be products available for purchase and the application server 130 may provide an online storefront through which the items can be purchased. In some example embodiments, the recommendation server 140, the item catalog 155, or both, are part of the data center 120.

An application executing on the application server 130 may access data from the database server 150. The letter suffixes of reference numbers may be omitted when doing so does not raise ambiguity. For example, the client devices 160A-160B may be referred to collectively as "client devices 160." Similarly, when the specific one of the client devices 160A-160B is not of particular import, "client device 160" may be referenced.

The application running on the application server 130 may provide services to the client devices 160A and 160B. For example, a user of the client device 160A may be an employee of a business using a business application. The user may use the services to generate invoices, manage employees, develop other applications, or any suitable combination thereof. The user interface for the application may be presented using a web interface 170 or an app interface 180.

The application server 130, the recommendation server 140, the database server 150, the item catalog 155, and the client devices 160A-160B may each be implemented in a computer system, in whole or in part, as described below with respect to FIG. 11. Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 11. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 130, the recommendation server 140, the database server 150, the item catalog 155, and the client devices 160A-160B are connected by the network 190. The network 190 may be any network that enables communication between or among machines, databases, and devices. Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Though FIG. 1 shows only one or two of each element (e.g., one recommendation server 140, one application server 130, two client devices 160A and 160B, and the like), any number of each element is contemplated. For example, the application server 130 may be one of dozens or hundreds of active and standby servers and provide services to millions of client devices. Likewise, the recommendation server 140 may be accessed by dozens, hundreds, or thousands of users with client devices 160, be used by many application servers 130, and so on.

Figure 2:
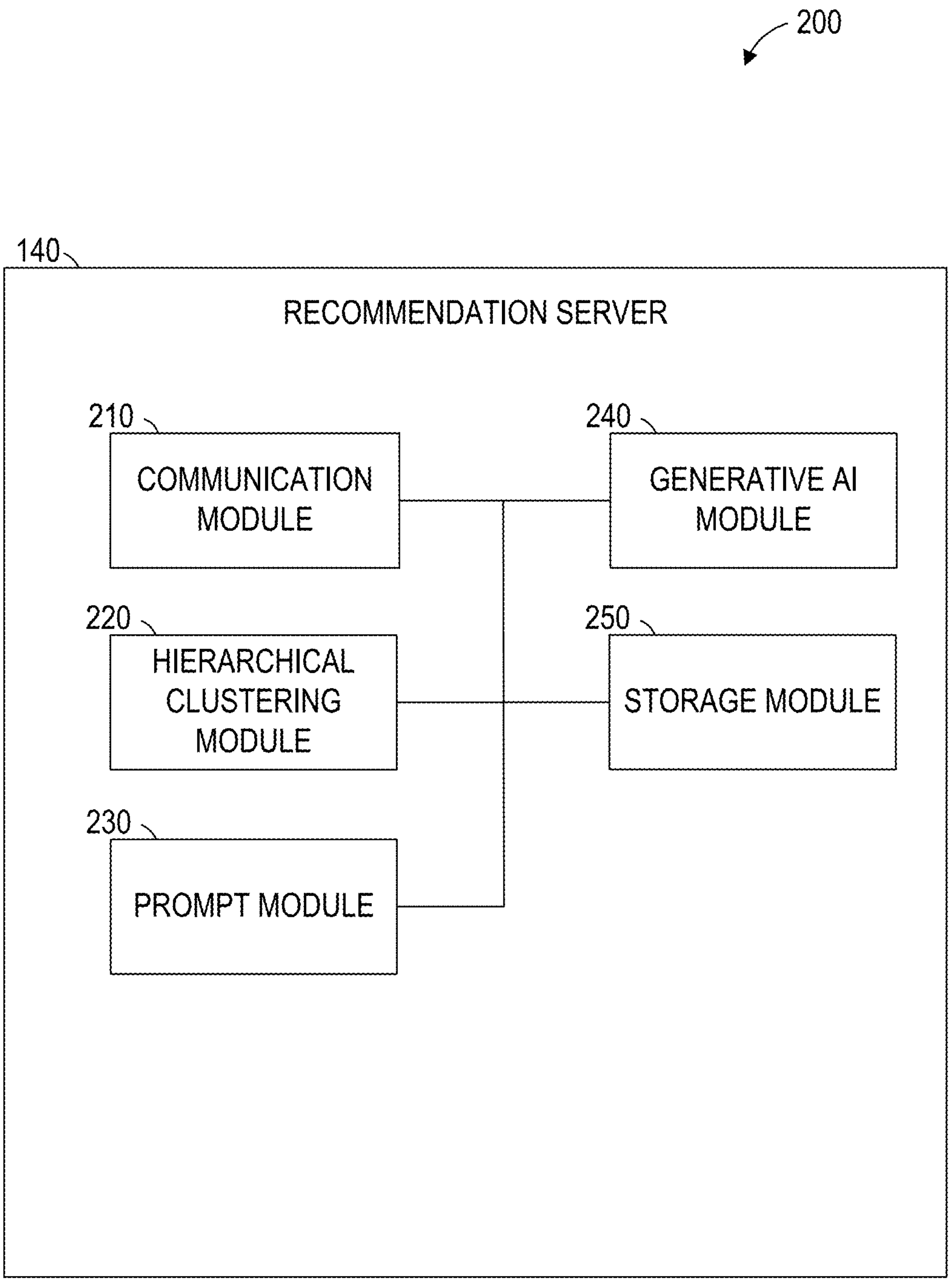
FIG. 2 shows a block diagram of a recommendation server, suitable for providing an LLM-based recommender system.

FIG. 2 shows a block diagram 200 of the recommendation server 140, suitable for providing an LLM-based recommender system. The recommendation server 140 is shown as including a communication module 210, a hierarchical clustering module 220, a prompt module 230, a generative AI module 240, and a storage module 250, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, modules described herein as being implemented within a single machine, database, or device may be distributed across multiple machines, databases, or devices.

The communication module 210 receives data sent to the recommendation server 140 and transmits data from the recommendation server 140. For example, the communication module 210 may receive, from the client device 160A, a request for a recommendation of one or more items. The request may include or reference a topic, a current item, a user profile, or any suitable combination thereof. In response, the communication module 210 provides the user input to the prompt module 230. The prompt module 230 generates a prompt based on the user input and provides the prompt to the generative AI module 240. The generative AI module 240 generates a recommendation. The communication module 210 may send recommendations to the client devices 160 or receive item metadata from the item catalog 155.

The hierarchical clustering module 220 generates a tree structure that clusters items from the item catalog 155. The leaf nodes represent individual items. The non-leaf nodes represent groups of items. Each node includes a description of the corresponding item or group of items.

The prompt module 230 generates prompts for an LLM. Each prompt may include metadata gathered from the item catalog 155, information provided by a user requesting the recommended item, information about the user requesting the recommended item, or any suitable combination thereof. The prompt module 230 may generate a sequence of prompts for repeated interaction with the LLM.

The generative AI module 240 includes an LLM that generates a recommendation for an item or group of items in response to a prompt. Using well-constructed prompts, a general-purpose LLM may provide high quality results without specialized training. An identifier of the recommended item (e.g., a name or unique numeric code) may be provided to the client device 160 or the application server 130.

Data, metadata, documents, instructions, or any suitable combination thereof may be stored and accessed by the storage module 250. For example, local storage of the asset recommendation server 140, such as a hard drive, may be used. As another example, network storage may be accessed by the storage module 250 via the network 190.

Figure 3:
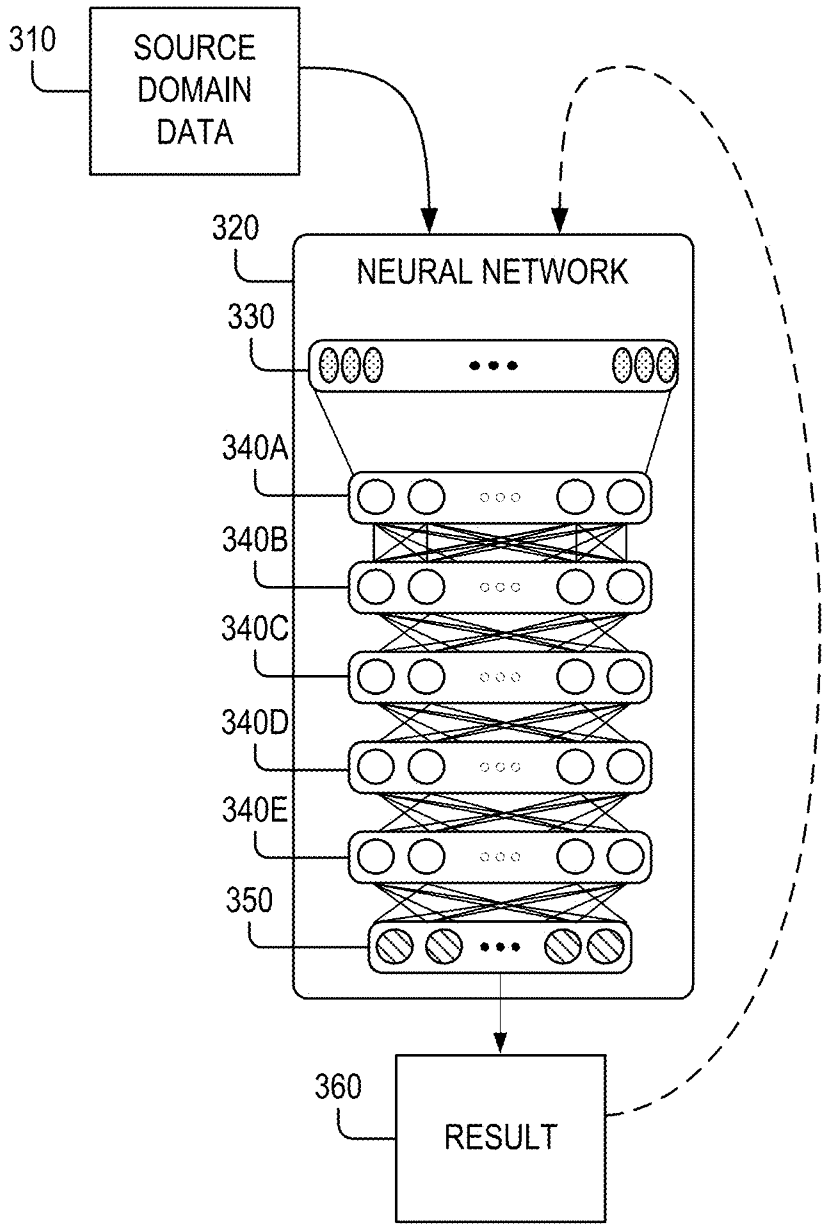
FIG. 3 is a block diagram of a neural network, suitable for use as a machine learning model for generating recommendations, according to some example embodiments.

FIG. 3 is a block diagram of a neural network 320, suitable for use as a machine learning model for generating recommendations, according to some example embodiments. The neural network 320 takes source domain data 310 as input and processes the source domain data 310 using an input layer 330; intermediate, hidden layers 340A, 340B, 340C, 340D, and 340E; and output layer 350 to generate a result 360.

A neural network, sometimes referred to as an artificial neural network, is a computing system based on consideration of biological neural networks of animal brains. Such systems progressively improve performance, which is referred to as learning, to perform tasks, typically without task-specific programming. For example, in image recognition, a neural network may be taught to identify images that contain an object by analyzing example images that have been tagged with a name for the object and, having learned the object and name, may use the analytic results to identify the object in untagged images.

A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

Each of the layers 330-350 comprises one or more nodes (or "neurons"). The nodes of the neural network 320 are shown as circles or ovals in FIG. 3. Each node takes one or more input values, processes the input values using zero or more internal variables, and generates one or more output values. The inputs to the input layer 330 are values from the source domain data 310. The output of the output layer 350 is the result 360. The intermediate layers 340A-340E are referred to as "hidden" because they do not interact directly with either the input or the output and are completely internal to the neural network 320. Though five hidden layers are shown in FIG. 3, more or fewer hidden layers may be used.

A model may be run against a training dataset for several epochs, in which the training dataset is repeatedly fed into the model to refine its results. In each epoch, the entire training dataset is used to train the model. Multiple epochs (e.g., iterations over the entire training dataset) may be used to train the model. In some example embodiments, the number of epochs is 10, 100, 500, or 1000. Within an epoch, one or more batches of the training dataset are used to train the model. Thus, the batch size ranges between one and the size of the training dataset, and the number of epochs is any positive integer value. The model parameters are updated after each batch (e.g., using gradient descent).

For self-supervised learning, the training dataset comprises self-labeled input examples. For example, a set of color images could be automatically converted to black-and-white images. Each color image may be used as a "label" for the corresponding black-and-white image and used to train a model that colorizes black-and-white images. This process is self-supervised because no additional information, outside of the original images, is used to generate the training dataset. Similarly, when text is provided by a user, one word in a sentence can be masked and the network trained to predict the masked word based on the remaining words.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the nth epoch, the learning phase may end early and use the produced model, satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that it has not been trained on. In a second example, a false positive rate or false negative rate may be used to evaluate the models after finalization. In a third example, a delineation between data clusters is used to select a model that produces the clearest bounds for its clusters of data.

The neural network 320 may be a deep learning neural network, a deep convolutional neural network (CNN), a recurrent neural network, a transformer neural network, or another type of neural network. A neuron is an architectural element used in data processing and artificial intelligence, particularly machine learning. A neuron implements a transfer function by which a number of inputs are used to generate an output. In some example embodiments, the inputs are weighted and summed, with the result compared to a threshold to determine if the neuron should generate an output signal (e.g., a 1) or not (e.g., a 0 output). The inputs of the component neurons are modified through the training of a neural network. One of skill in the art will appreciate that neurons and neural networks may be constructed programmatically (e.g., via software instructions) or via specialized hardware linking each neuron to form the neural network.

An example type of layer in the neural network 320 is a Long Short Term Memory (LSTM) layer. An LSTM layer includes several gates to handle input vectors (e.g., time-series data), a memory cell, and an output vector. The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input. Thus, the coefficients assign significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight updates. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value, which roughly represents its contribution to the original output. Backpropagation can use these error values to calculate the gradient of the cost function with respect to the weights in the neural network. The calculated gradient is fed to the selected optimization method to update the weights to attempt to minimize the cost function.

In some example embodiments, the structure of each layer is predefined. For example, a convolution layer may contain small convolution kernels and their respective convolution parameters, and a summation layer may calculate the sum, or the weighted sum, of two or more values. Training assists in defining the weight coefficients for the summation.

One way to improve the performance of DNNs is to identify newer structures for the feature-extraction layers, and another way is by improving the way the parameters are identified at the different layers for accomplishing a desired task. For a given neural network, there may be millions of parameters to be optimized. Trying to optimize all these parameters from scratch may take hours, days, or even weeks, depending on the amount of computing resources available and the amount of data in the training set.

One of ordinary skill in the art will be familiar with several machine learning algorithms that may be applied with the present disclosure, including linear regression, random forests, decision tree learning, neural networks, DNNs, genetic or evolutionary algorithms, and the like. With the help of natural language processing (NLP) and advanced data pre-processing, a machine learning model (e.g., the neural network 320) can be trained on historical (existing) data (for instance, resource usage data) from the system to predict future data.

The transformer architecture processes an entire input at once rather than sequentially. For example, a recurrent neural network (RNN) processes words or sentences sequentially, with the output of the RNN treated as an input for each input after the first (thus the use of the word "recurrent" in the name). As a result, relationships between elements that are far apart in the input are difficult to detect. The transformer architecture receives a larger input and learns the interrelationships between the elements and the output using an attention mechanism. Since all elements are processed together, distance between the elements of the input does not affect the learning process. The output may still be generated sequentially, with the previous result (e.g., word for an LLM, pixel for an image-generating artificial intelligence, and the like) being provided as an input for determination of the next result.

Figure 4:
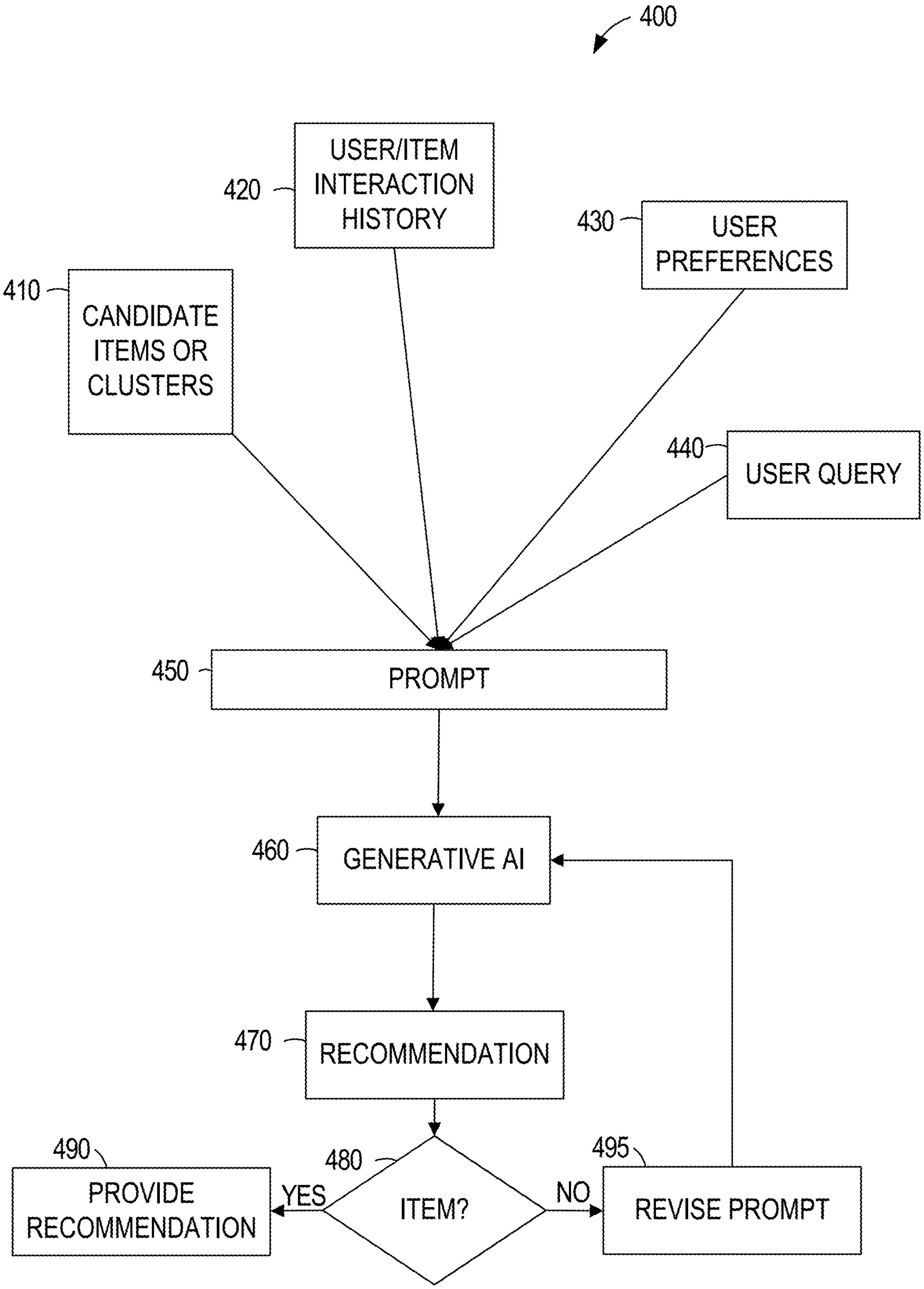
FIG. 4 illustrates a data flow for an LLM-based recommender system, according to some example embodiments.

FIG. 4 illustrates a data flow 400 for an LLM-based recommender system, according to some example embodiments. Candidate items or clusters 410, user/item interaction history 420, user preferences 430, user query 440, or any suitable combination thereof, are used to generate a prompt 450. The prompt 450 is provided to a generative AI 460. In response to the prompt 450, the generative AI 460 generates a recommendation 470. The recommendation 470 may be for an item or a cluster of items. If the recommendation 470 is for an item, operations 480 and 490 provide the recommendation. Otherwise, the prompt is revised in operation 495 and the revised prompt is provided to the generative AI 460. The data flow 400 continues until the recommendation 470 is for an item.

The candidate items or clusters 410 identify the items or clusters that the generative AI 460 is to select from when making the recommendation 470. The candidate items or clusters 410 may initially be the top-level nodes of a tree generated using hierarchical clustering. The user/asset interaction history 420 comprises data showing past item interactions by the user for whom a recommendation is being made. For example, the interactions may include liking an item, viewing an item, rejecting an item, rating an item, or any suitable combination thereof. The user preferences 430 comprises data showing preferences for the user for whom the recommendation is being made. For example, the preferences may include interests of the user such as genre, type, contents, or any suitable combination thereof. The user query 440 comprises a query provided by the user.

The prompt 450 is based on one or more of the candidate items or clusters 410, the user/item interaction history 420, the user preferences 430, and the user query 440. For example, the prompt 450 could be based on the candidate items or clusters 410 and the user query 440 by including the user query 440 and instructing the generative AI to select from among the candidate items or clusters 410.

The prompt 450 may be precluded from including each possible item due to a size limitation for input to the generative AI 460. For example, if the average name of an item is twelve characters and the maximum prompt size is 5,000 characters, then a list of 416 items would consume the entire prompt limit. When more items are available, the plurality of items exceeds the size limit for input to the generative AI 460. As a result, in such cases, the first iteration of operation 480 will never result in providing a recommendation. Instead, multiple iterations will be performed.

The generative AI 460 (e.g., an LLM) generates a recommendation 470 in response to the prompt 450. If the recommendation 470 is for an item (checked in operation 480), the recommendation is provided to the user (operation 490).

Otherwise, the prompt is revised in operation 495 based on the recommendation 470. For example, the user query 440 may be a request for a recommendation of a particular model of car. Hierarchical clustering of all available car models may result in a tree with country of origin as the first level, makes as the second level, and individual models as the third level of the tree. Accordingly, the first prompt 450 asked for a recommendation of a country of origin and the recommendation 470 is for a country of origin, not an individual item. In operation 495, the prompt 450 is revised to ask for a recommendation of a particular make within the recommended country of origin. On the second iteration, the recommendation 470 is still not for an individual item, so operation 495 is repeated. This time, the revised prompt asks for a particular model of the particular make. As a result, the third recommendation 470 is for an individual item and the recommendation 470 is provided to the user in operation 490.

Figure 5:
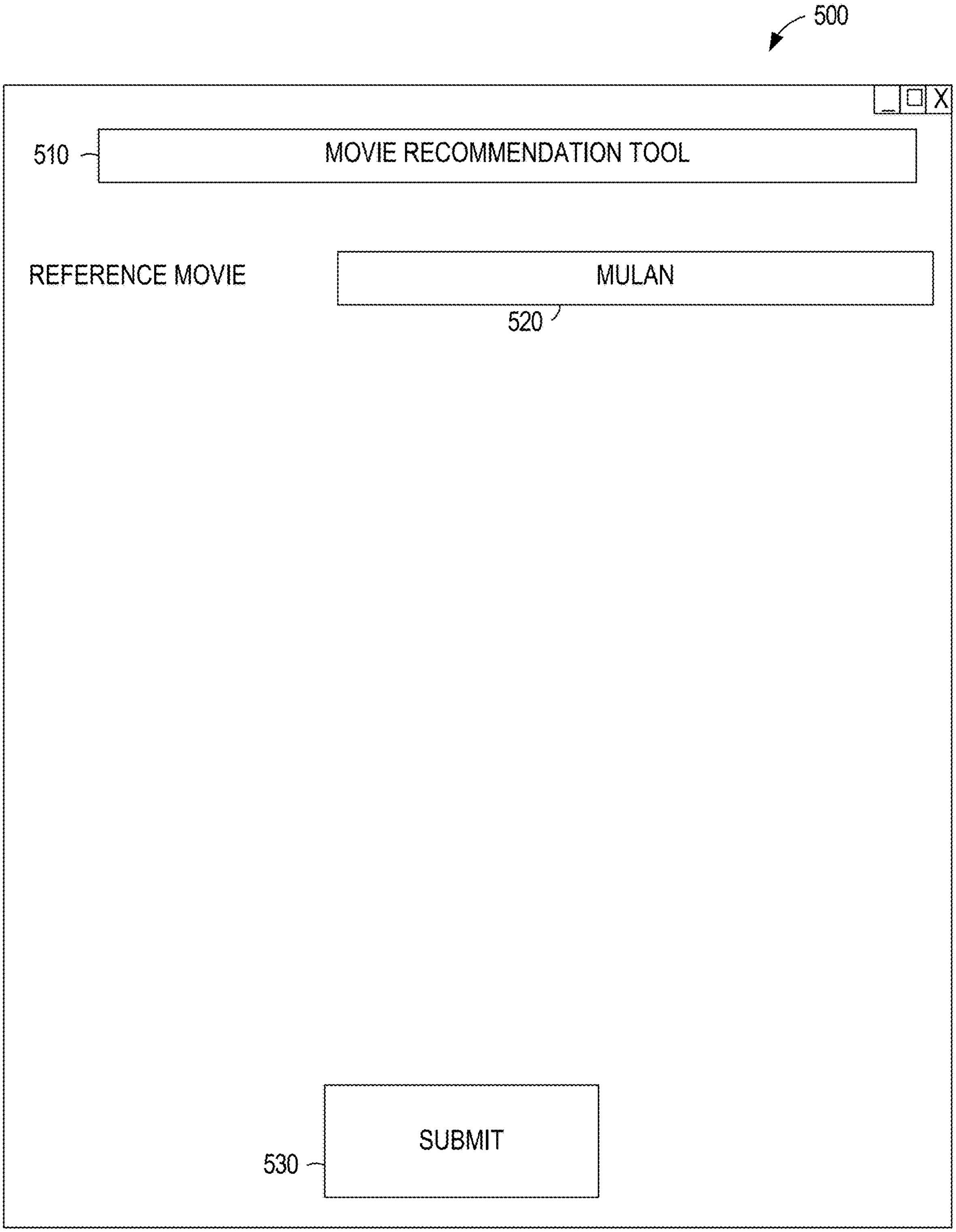
FIG. 5 shows an illustration of a user interface suitable for a recommendation tool, according to some example embodiments.

FIG. 5 shows an illustration of a user interface 500 suitable for a recommendation tool, according to some example embodiments. The user interface 500 includes a title 510, an input field 520, and a button 530. The user interface 500 may be presented on a display of one of the client devices 160, for use by a user seeking a recommendation.

The title 510 indicates that the user interface 500 is for a movie recommendation tool. The input field 520 receives, from a user, a reference movie to be used to generate the recommendation. The input field 520 may be submitted for processing using the button 530. In response to detecting operation of the button 530, the recommendation server 140 may gather the input from the input field 520, combine the input with other data about the user and available items, generate a prompt, provide the generated prompt to a generative AI, and receive a recommendation from the generative AI.

With reference to the data flow 400 of FIG. 4, the reference movie received from the user in the input field 520 may be used to construct the user query 440. For example, the user query 440 may be constructed by the recommendation server 140, including the contents of the input field 520: "I like Mulan. Please recommend another movie that you think I will like."

Figure 6:
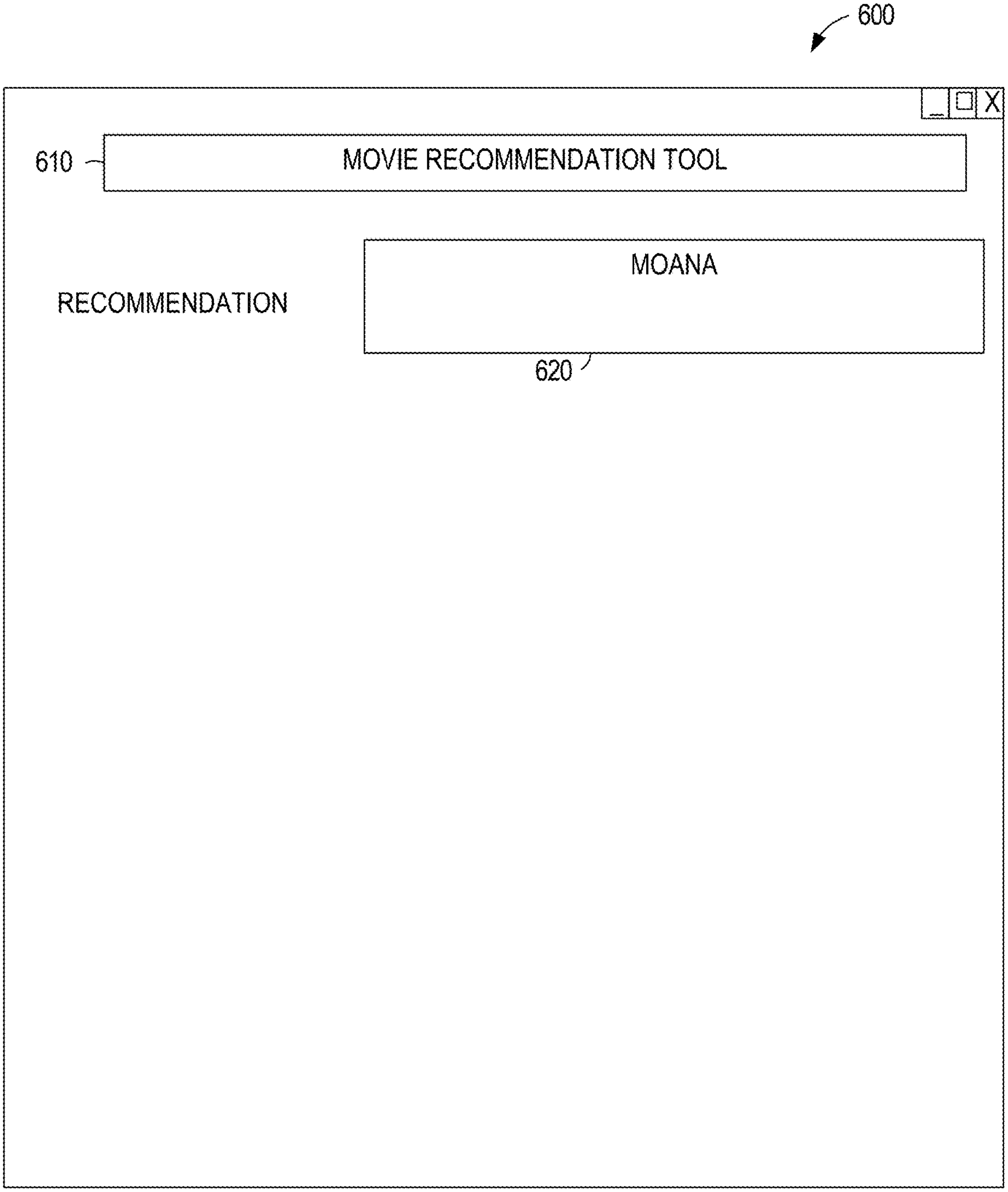
FIG. 6 shows an illustration of a user interface suitable for a recommendation tool, according to some example embodiments.

FIG. 6 shows an illustration of a user interface 600 suitable for a recommendation tool, according to some example embodiments. The user interface 600 includes a title 610 and an output field 620. The user interface 600 may be presented on a display of one of the client devices 160, after use of the user interface 500 of FIG. 5.

The title 610 indicates that the user interface 600 is for a movie recommendation tool. The output field 620 shows a recommendation generated by the movie recommendation tool. The output field 620 may have been generated by the recommendation server 140 using the data flow 400 and in response to a user query provided by a user of the user interface 500 of FIG. 5.

Figure 7:
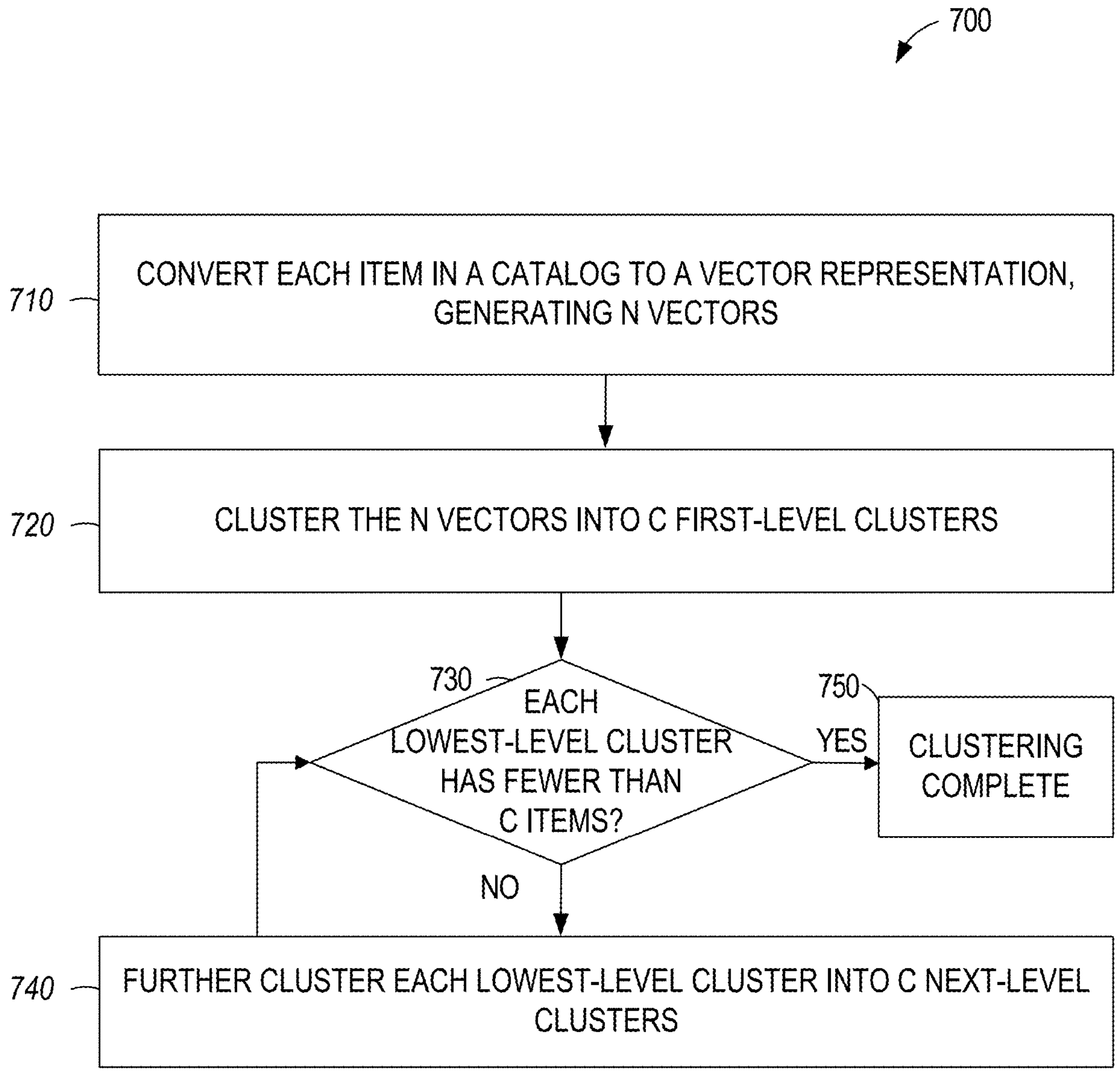
FIG. 7 illustrates a method of generating a hierarchical cluster of items, according to some example embodiments.

FIG. 7 illustrates a method 700 of generating a hierarchical cluster of items, according to some example embodiments. The method 700 includes operations 710, 720, 730, 740, and 750. By way of example and not limitation, the method 700 is described as being performed by the recommendation server 140 of FIG. 1, using the modules of FIG. 2 and the neural network of FIG. 3.

In operation 710, the hierarchical clustering module 220 converts each item in a catalog to a vector representation, generating N vectors, one for each item. For example, the catalog may include information about each item such as a name, a description, a genre, a category, a name of a company or individual that created the item, and the like. Accordingly, metadata for each item in the catalog may be extracted (e.g., by accessing a database).

The metadata for each item in the catalog is converted to a vector representation. For example, a look up table may be used to determine a high-dimensional (e.g., greater than one hundred dimensions) vector for one or more words of the information about the item. Multiple vectors for an item may be combined by adding them together.

To convert an item in the catalog to its vector representation, the hierarchical clustering module 220 may first extract its metadata, such as the title and description, to form a textual string that uniquely describes the item. A pre-trained semantic textual similarity model, such as MPNet, that converts this text into a vector may be used. As such semantic textual similarity models are trained to produce vectors whereby text with the same semantics will be converted to similar vectors in vector space, this property is used in the next clustering step. The output of this step is a set of vectors $V=\{v_1, v_2, \ldots, v_N\}$ representing N items in the catalog.

The hierarchical clustering module 220 clusters the N vectors into C first-level clusters in operation 720. At the first step of the clustering algorithm, the N vectors are clustered into C groups, where each group contains approximately NC vectors. At the next step, each group of NC vectors are further clustered using the clustering algorithm into another C sub-clusters, each containing $NC^2$ items. This process continues until either each sub-cluster contains less than C items, whereby each of the items become a leaf of the tree, or the maximum depth L is reached. This hierarchical tree contains M clusters at each level and L levels, where M and L are hyper-parameters that can be tuned or selected using business knowledge based on the number of available items N. For example, if N is 50 and C is 4, a clustering algorithm (e.g., k-means) is used to divide the 50 items into four clusters. The average cluster will contain about twelve items.

In operation 730, the hierarchical clustering module 220 determines if each lowest-level cluster has fewer than C items. In this example, C is four and at least one of the clusters has more than four items. Accordingly, the method 700 continues with operation 740.

The hierarchical clustering module 220 clusters each lowest-level cluster into C next-level clusters (operation 740). In this example, each of the four clusters, containing about twelve items, is clustered into four next-level clusters. Thus, after the first iteration of operation 740, there will be C-squared lowest-level clusters, sixteen in this example.

If each lowest-level cluster has fewer than C items (operation 730), then the clustering is complete (operation 750). Otherwise, operations 740 and 730 are repeated to create additional layers in the hierarchical cluster until the condition of operation 730 is met.

The hierarchical cluster may be represented as a tree structure in which the root node represents the entire catalog. A child node of the root node is created to represent each of the first-level clusters created in operation 720. Grandchild nodes are created to represent the next-level clusters of operation 740, and so on. When clustering is complete, leaf nodes are created that represent the individual items in the lowest-level clusters.

Figure 8:
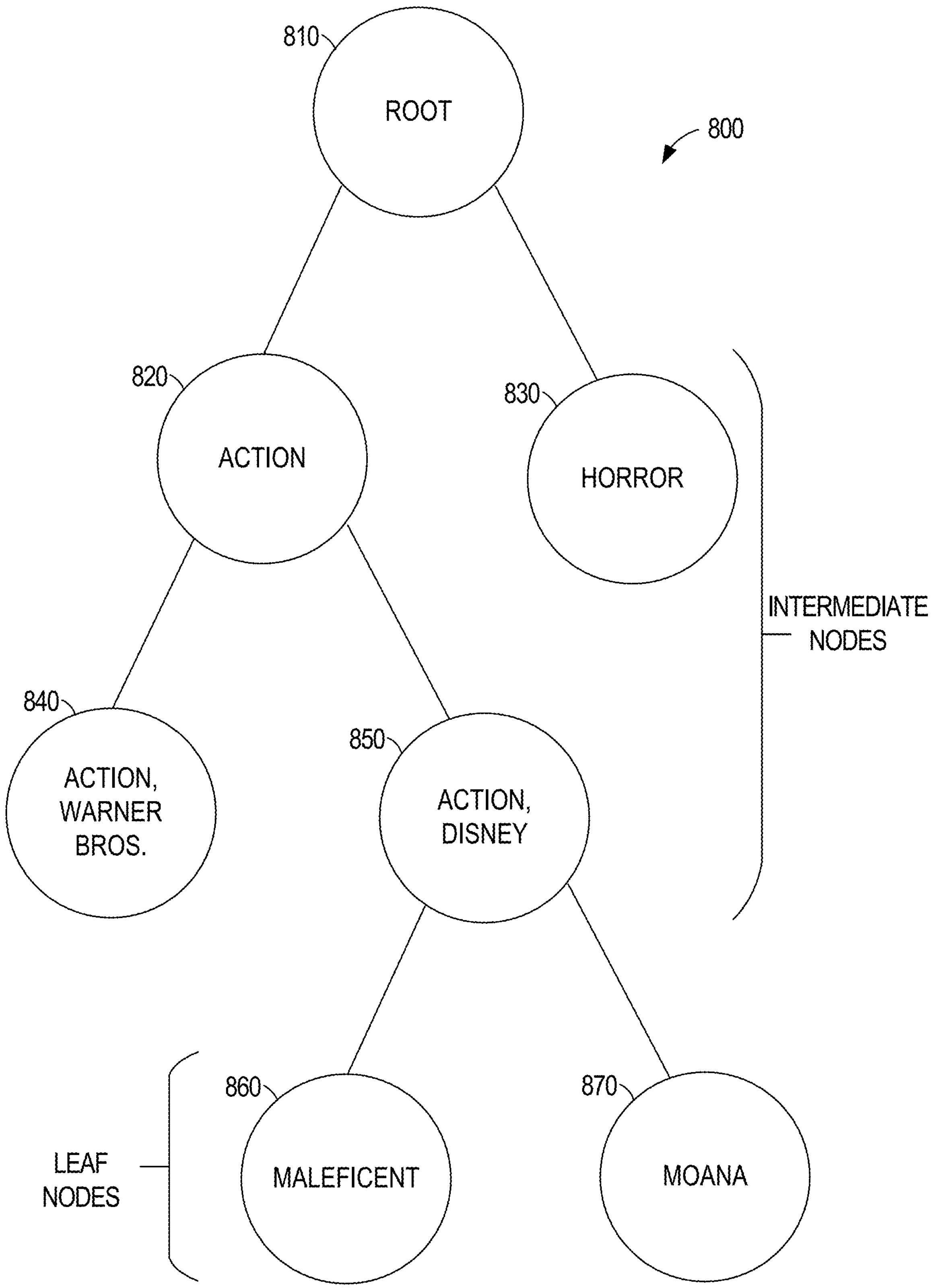
FIG. 8 illustrates an example tree structure with data for a hierarchical cluster of items.

FIG. 8 illustrates an example tree structure 800 with data for a hierarchical cluster of items. For simplicity, child nodes are shown for only a single node at each level of the tree structure 800. Additionally, while only a few nodes are shown, in practice, the hierarchical cluster may include thousands or hundreds of thousands of items.

The tree structure 800 includes a root node 810, leaf nodes 860 and 870, and intermediate nodes 820, 830, 840, and 850. The tree structure 800 represents a catalog of movies available for recommendation. With reference to the method 700 of FIG. 7, a vector representation for each item in the catalog of movies was generated in operation 710. The vectors were clustered into C=2 first-level clusters (operation 720), represented by the nodes 820 and 830. Each first-level cluster was clustered into C=2 second-level clusters (operation 740). Only the second-level clusters for the cluster represented by the node 820 are shown, represented by the nodes 840 and 850. At that point, each lowest-level cluster had C or fewer items, so the items in each lowest-level cluster are represented by leaf nodes 860 and 870.

The description for each node may be generated by the generative AI module 240 of FIG. 2, beginning with the leaf nodes 860 and 870. For example, a prompt such as "Please provide a short description for an item with the following metadata" may be provided to an LLM, followed by the metadata for the item. The response from the LLM may be stored in association with each leaf node. For each intermediate node, a prompt such as "Please provide a short description for a group of items with the following descriptions" may be used, followed by the generated description for each item in the corresponding lowest-level cluster. The process may be repeated, working up the tree structure, until a description has been generated for each intermediate and leaf node.

In some example embodiments, the metadata for each item is used as the description of the corresponding leaf node. For each non-leaf node in the tree structure, the prompt module 230 generates a prompt for the LLM that instructs the LLM to summarize the child nodes of the non-leaf node. The generative AI module 240 provides, in response to the prompt, an output comprising a summary of the non-leaf node. The hierarchical clustering module 220 assigns to each non-leaf node, the summary of the node as a description of the non-leaf node.

Figure 9:
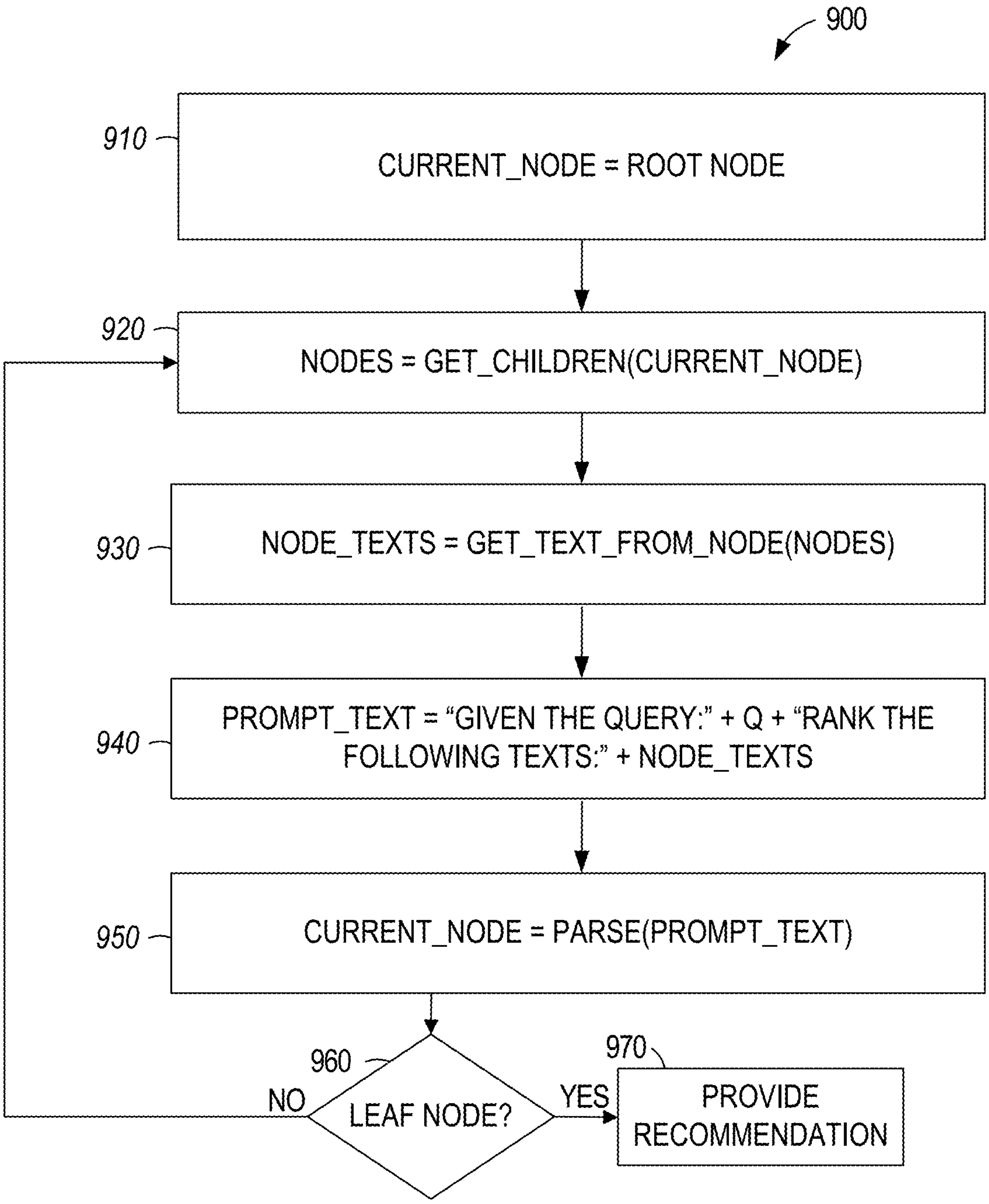
FIG. 9 illustrates a method of providing an LLM-based recommender system, according to some example embodiments.

FIG. 9 illustrates a method 900 of providing an LLM-based recommender system, according to some example embodiments. The method 900 includes operations 910, 920, 930, 940, 950, 960, and 970. By way of example and not limitation, the method 900 is described as being performed by the recommendation server 140 of FIG. 1, using the modules of FIG. 2, the machine learning model of FIG. 3, the user interfaces of FIGS. 5-6, and the tree structure of FIG. 8.

In operation 910, a current_node variable is set to the root node of a tree structure (e.g., the node 810 of FIG. 8). The leaf nodes of the tree structure (e.g., the leaf nodes 860 and 870 of FIG. 8) represent items to be recommended. Each intermediate node (e.g., the intermediate nodes 820-860 of FIG. 8) of the tree structure represents the group of nodes below it.

A nodes variable is set to the children of the current node in operation 920. Continuing with the example tree structure 800 of FIG. 8, nodes contains the nodes 820 and 830. In operation 930, a node_texts variable is set to the text from the nodes identified by the nodes variable. For example, node_texts may be set to {"ACTION", "HORROR"}.

A user query may be generated by the recommendation server 140 in response to a user input. For example, the user interface 500 of FIG. 5 asks the user to provide a reference movie. The user has provided "Mulan" as the reference movie. The user query may be generated by providing additional context for the user input. For example, the user query may be constructed as "Please recommend a movie for me like Mulan." In FIG. 9, the user query is referenced as Q.

In operation 940, the recommendation server 140 creates prompt text based on Q and the node_texts. In this example, prompt_text is set to "Given the query: Please recommend a movie for me like Mulan. Rank the following texts: 'ACTION', 'HORROR'."

The parse( ) function takes a prompt for a generative AI as a parameter, receives a response from the generative AI, and translates the response to a node of the tree structure. In operation 950, current_node is set equal to parse (prompt_text). For example, the generative AI may respond to the prompt with "ACTION." The parse function determines that "ACTION" identifies the node 820 of the tree structure 800. As a result, current_node is updated to refer to the node 820.

If the current_node is a leaf node (checked in operation 960), a recommendation of the corresponding item is provided (operation 970). Otherwise, operations 920-950 are repeated.

In this example, current_node refers to the node 820, which is not a leaf node. Accordingly, in operation 920, the nodes variable is updated to refer to the children of the node 820, the nodes 840 and 850. In operation 930, the node_texts variable is updated to {"ACTION, WARNER BROS.", "ACTION, DISNEY"}. The query, Q, is unchanged, but node_texts has been updated. Accordingly, in this iteration of operation 940, prompt_text is set to "Given the query: Please recommend a movie for me like Mulan. Rank the following texts: 'ACTION, WARNER BROS.', 'ACTION, DISNEY'." Operation 950 is repeated and, in this example, current_node is updated to refer to the node 850.

Since the node 860 is still not a leaf node (checked in operation 960), operations 920-950 are repeated again. Accordingly, in operation 920, the nodes variable is updated to refer to the children of the node 850, the nodes 860 and 870. In operation 930, the node_texts variable is updated to {"MALEFICENT", "MOANA"}. The query, Q, is unchanged, but node_texts has been updated. Accordingly, in this iteration of operation 940, prompt_text is set to "Given the query: Please recommend a movie for me like Mulan. Rank the following texts: 'MALEFICENT', 'MOANA'." Operation 950 is repeated and, in this example, current_node is updated to refer to the node 870.

The node 870 is a recommendation. Accordingly, the method 900 continues with operation 970 and the corresponding item is recommended. For example, the user interface 600 of FIG. 6 may be presented, including the name of the recommended item.

Figure 10:
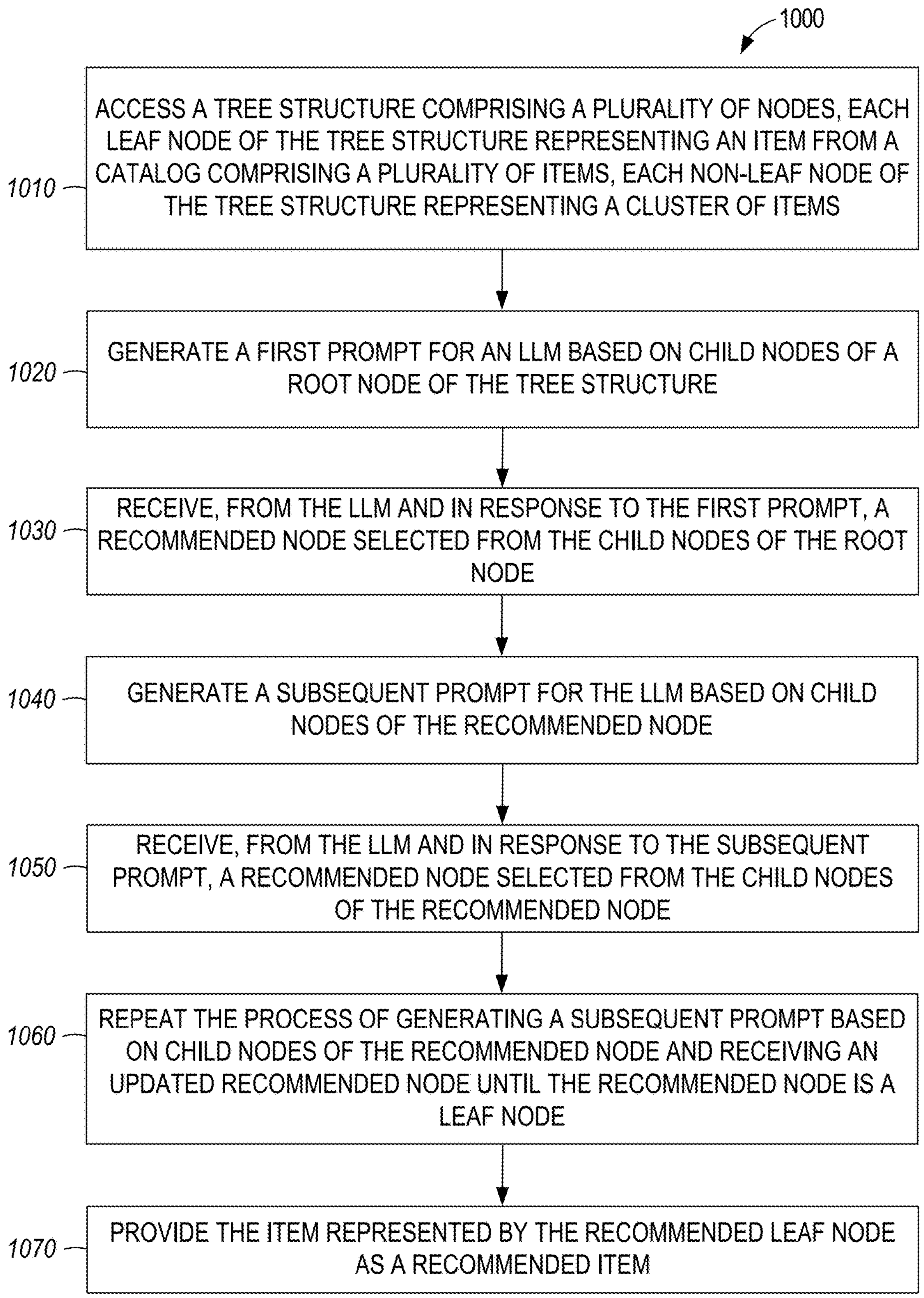
FIG. 10 illustrates a method of providing an LLM-based recommender system, according to some example embodiments.

FIG. 10 illustrates a method 1000 of providing an LLM-based recommender system, according to some example embodiments. The method 1000 includes operations 1010, 1020, 1030, 1040, 1050, 1060, and 1070. By way of example and not limitation, the method 1000 is described as being performed by the recommendation server 140 of FIG. 1, using the modules of FIG. 2, the neural network of FIG. 3, the user interfaces of FIGS. 5-6, and the tree structure of FIG. 8.

In operation 1010, the prompt module 230 accesses a tree structure comprising a plurality of nodes, each leaf node of the tree structure representing an item from a catalog comprising a plurality of items, each non-leaf node of the tree structure representing a cluster of items. For example, the tree structure 800 may be accessed, in which the leaf nodes 860-870 represent individual items (movies, in this example). Each non-leaf node represents a cluster of items comprising the items of all of the leaf nodes below the non-leaf node. Thus, the node 850 represents the cluster comprising Maleficent and Moana, the node 830 represents the cluster comprising Maleficent and Moana as well as a cluster of action movies from Warner Bros., and the node 810 represents the entire catalog.

The prompt module 230 generates a first prompt for an LLM based on child nodes of a root node of the tree structure in operation 1020. The first prompt may ask the LLM to recommend one of the clusters represented by the child nodes. For example, the first prompt may ask the LLM to recommend either the cluster of all action movies represented by the node 820 or the cluster of all horror movies represented by the node 830, with the nodes 820 and 830 being the child nodes of the root node of the tree structure 800. To illustrate, the first prompt may be "Given the following movie, 'Mulan', which cluster will I prefer from the following list: L=1, N=1 (Summary: Action) or L=1, N=2 (Summary: Horror)?" In this prompt, L represents the level and N identifies the node within the level.

In operation 1030, the recommendation server 140 receives, from the LLM and in response to the first prompt, a recommended node selected from the child nodes of the root node. Continuing with this example, the recommended node may be the node 820. To illustrate, the response may be "You would prefer movies from the following cluster: L=1, N=1 (Summary: Action)."

The prompt module 230 generates a subsequent prompt for the LLM based on child nodes of the recommended node. In this example, the subsequent prompt may ask the LLM to recommend either the cluster of Warner Bros. action movies represented by the node 840 or the cluster of Disney action movies represented by the node 850. To illustrate, the subsequent prompt may be "Given the following movie, 'Mulan', which cluster will I prefer from the following list: L=2, N=1 (Summary: Action, Warner Brothers) or L=2, N=2 (Summary: Action, Disney)?"

In operation 1050, the recommendation server 140 receives, from the LLM and in response to the subsequent prompt, a recommended node selected from the child nodes of the recommended node. Continuing with this example, the recommended node may be the node 860. To illustrate, the second response may be "You would prefer movies from the following cluster: L=2, N=2 (Summary: Action, Disney)."

The process of operations 1040-1050 is repeated until the recommended node is a leaf node (operation 1060). In this example, when either the node 860 or the node 870 is the recommended node, the recommended node is a leaf node. The item represented by the recommended leaf node is presented as a recommended item in operation 1070. For example, the user interface 600 of FIG. 6, showing the name of the recommended item may be used.

To illustrate, the third prompt may be "Given the following movie, "Mulan", which cluster will I prefer from the following list: L=3, N=1 (Maleficent) or L=3, N=2 (Moana) ?" And the third response may be "You would prefer movies from the following cluster: L=3, N=2 (Moana)."

Compared to existing LLM-based recommendation methods, which either require a number of accesses to the LLM directly proportional to the number of items in a catalog, or only support a subset of items from the available items, the method disclosed herein faces neither of these problems. During the clustering and tree construction phrase, the lowermost layer requires $M^{L-1}$ LLM accesses to generate summaries, where M is the number of pre-set clusters and L is the depth of the tree. In a practical sense, for example, 1 million items can be stored in the tree structure by selecting M=100, L=3 ($100^3$=1,000,000). In this example, the LLM would be accessed $100^2$=10,000 times to generate the summaries for each intermediate node. Also, this is a one-time effort during tree construction, compared to existing methods where the LLM has to be accessed per set of recommendations generated.

During inference, as recommendations are generated by traversing the tree, it requires at most L traversals to reach the leaves of the tree. In practice, L can be chosen with respect to the number of items that can be recommended, N, for example, $L=\log_C N$. Therefore, the number of LLM accesses needed increases in a logarithmic manner with respect to N. Continuing from the previous example of N=1,000,000, prior re-ranking methods require accessing the LLM 1,000,000 times, while the method disclosed herein only requires accessing the LLM L=3 times.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system for generating recommendations, the system comprising: a memory that stores instructions; and one or more processors coupled to the memory and configured to execute the instructions to perform operations comprising: accessing a tree structure comprising a plurality of nodes, each leaf node of the tree structure representing an item from a catalog comprising a plurality of items, each non-leaf node of the tree structure representing a cluster of items; generating a first prompt for a large language model (LLM) based on child nodes of a root node of the tree structure; receiving, from the LLM and in response to the first prompt, a recommended node selected from the child nodes of the root node; generating a subsequent prompt for the LLM based on child nodes of the recommended node; receiving, from the LLM and in response to the subsequent prompt, an updated recommended node selected from the child nodes of the recommended node; repeating the process of generating a subsequent prompt based on child nodes of the recommended node and receiving an updated recommended node until the recommended node is a leaf node; and providing the item represented by the recommended leaf node as a recommended item.

In Example 2, the subject matter of Example 1, wherein the operations further comprise generating the tree structure, the generating of the tree structure comprising: extracting, for each item in the catalog, metadata for the item; converting, for each item in the catalog, the metadata for the item to a vector representation; based on the vector representations, clustering the items using hierarchical clustering; and generating the tree structure based on the hierarchical clustering.

In Example 3, the subject matter of Example 2, wherein the generating of the tree structure further comprises: assigning, for each item in the catalog, the metadata for the item as a description of the leaf node created for the item; and for each non-leaf node in the tree structure: generating a prompt for the LLM that instructs the LLM to summarize the child nodes of the non-leaf node; receiving, from the LLM and in response to the prompt, an output comprising a summary of the non-leaf node; and assigning, to the node, the summary of the node as a description of the non-leaf node.

In Example 4, the subject matter of Examples 2-3, wherein the plurality of items exceeds a size limit for input to the LLM.

In Example 5, the subject matter of Examples 1-4, wherein the generating of the first prompt is further based on a user interest.

In Example 6, the subject matter of Examples 1-5, wherein the generating of the first prompt is further based on a user query.

In Example 7, the subject matter of Examples 1-6, wherein the generating of the first prompt is further based on a user's past interactions.

Example 8 is a non-transitory computer-readable medium that stores instructions that, when executed by one or more processors, cause the one or more processors to perform operations comprising: accessing a tree structure comprising a plurality of nodes, each leaf node of the tree structure representing an item from a catalog comprising a plurality of items, each non-leaf node of the tree structure representing a cluster of items; generating a first prompt for a large language model (LLM) based on child nodes of a root node of the tree structure; receiving, from the LLM and in response to the first prompt, a recommended node selected from the child nodes of the root node; generating a subsequent prompt for the LLM based on child nodes of the recommended node; repeating the process of generating a subsequent prompt based on child nodes of the recommended node and receiving an updated recommended node until the recommended node is a leaf node; repeating the process of generating a prompt based on child nodes of the recommended node until the recommended node is a leaf node; and providing the item represented by the recommended leaf node as a recommended item.

In Example 9, the subject matter of Example 8, wherein the operations further comprise generating the tree structure, the generating of the tree structure comprising: extracting, for each item in the catalog, metadata for the item; converting, for each item in the catalog, the metadata for the item to a vector representation; based on the vector representations, clustering the items using hierarchical clustering; and generating the tree structure based on the hierarchical clustering.

In Example 10, the subject matter of Example 9 includes, wherein the generating of the tree structure further comprises: assigning, for each item in the catalog, the metadata for the item as a description of the leaf node created for the item; and for each non-leaf node in the tree structure: generating a prompt for the LLM that instructs the LLM to summarize the child nodes of the non-leaf node; receiving, from the LLM and in response to the prompt, an output comprising a summary of the non-leaf node; and assigning, to the node, the summary of the node as a description of the non-leaf node.

In Example 11, the subject matter of Examples 9-10, wherein the plurality of items exceeds a size limit for input to the LLM.

In Example 12, the subject matter of Examples 8-11, wherein the generating of the first prompt is further based on a user interest.

In Example 13, the subject matter of Examples 8-12, wherein the generating of the first prompt is further based on a user query.

In Example 14, the subject matter of Examples 8-13, wherein the generating of the first prompt is further based on a user's past interactions.

Example 15 is a method comprising: accessing, by one or more processors, a tree structure comprising a plurality of nodes, each leaf node of the tree structure representing an item from a catalog comprising a plurality of items, each non-leaf node of the tree structure representing a cluster of items; generating a first prompt for a large language model (LLM) based on child nodes of a root node of the tree structure; receiving, from the LLM and in response to the first prompt, a recommended node selected from the child nodes of the root node; generating a subsequent prompt for the LLM based on child nodes of the recommended node; repeating the process of generating a subsequent prompt based on child nodes of the recommended node and receiving an updated recommended node until the recommended node is a leaf node; repeating the process of generating a prompt based on child nodes of the recommended node until the recommended node is a leaf node; and providing the item represented by the recommended leaf node as a recommended item.

In Example 16, the subject matter of Example 15 includes generating the tree structure, the generating of the tree structure comprising: extracting, for each item in the catalog, metadata for the item; converting, for each item in the catalog, the metadata for the item to a vector representation; based on the vector representations, clustering the items using hierarchical clustering; and generating the tree structure based on the hierarchical clustering.

In Example 17, the subject matter of Example 16, wherein the generating of the tree structure further comprises: assigning, for each item in the catalog, the metadata for the item as a description of the leaf node created for the item; and for each non-leaf node in the tree structure: generating a prompt for the LLM that instructs the LLM to summarize the child nodes of the non-leaf node; receiving, from the LLM and in response to the prompt, an output comprising a summary of the non-leaf node; and assigning, to the node, the summary of the node as a description of the non-leaf node.

In Example 18, the subject matter of Examples 16-17, wherein the plurality of items exceeds a size limit for input to the LLM.

In Example 19, the subject matter of Examples 15-18, wherein the generating of the first prompt is further based on a user interest.

In Example 20, the subject matter of Examples 15-19, wherein the generating of the first prompt is further based on a user query.

Example 21 is an apparatus comprising means to implement any of Examples 1-20.

Figure 11:
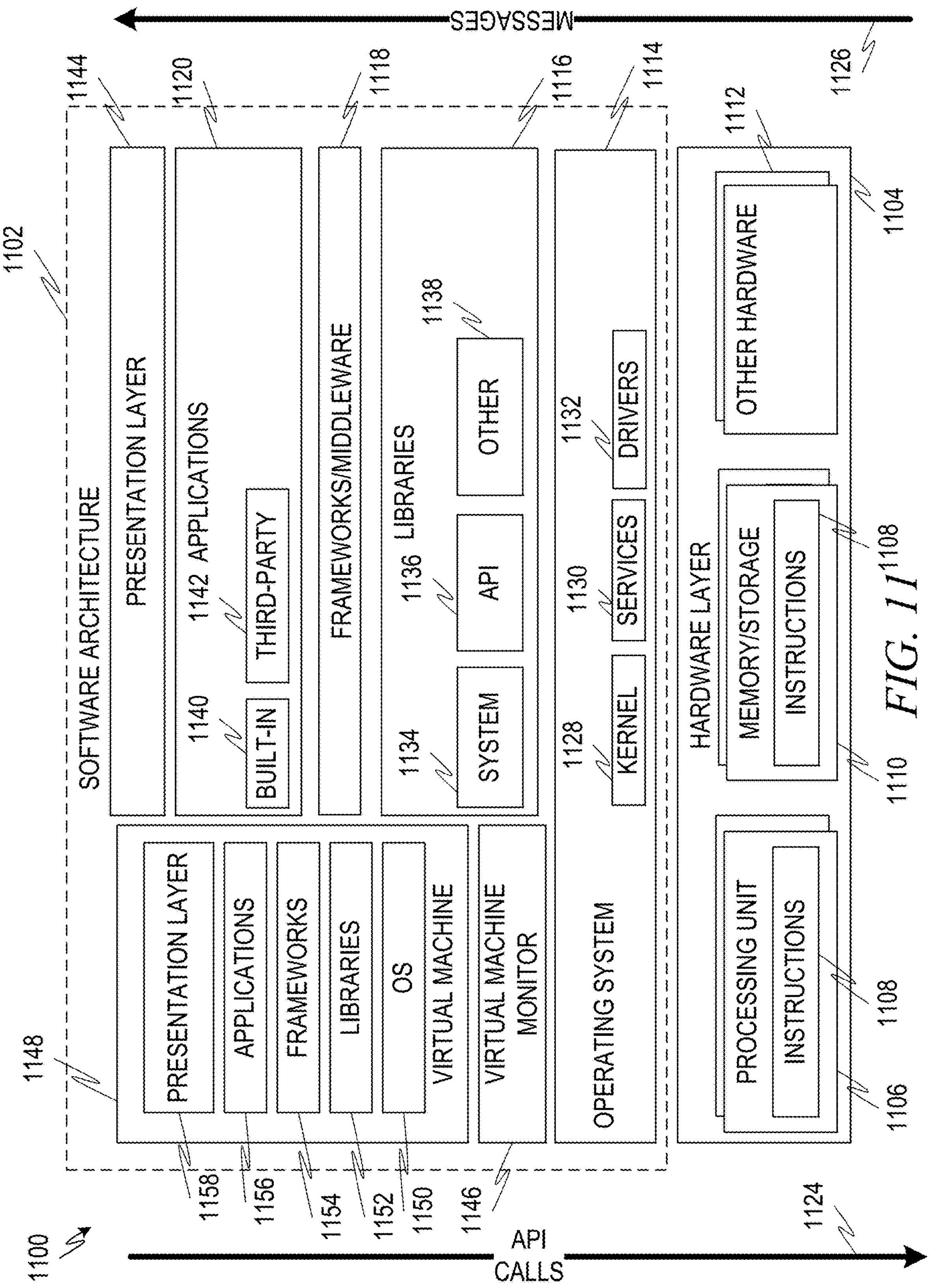
FIG. 11 shows a block diagram showing one example of a software architecture for a computing device.

FIG. 11 shows a block diagram 1100 showing one example of a software architecture 1102 for a computing device. The software architecture 1102 may be used in conjunction with various hardware architectures, for example, as described herein. FIG. 11 is merely a non-limiting example of a software architecture, and many other architectures may be implemented to facilitate the functionality described herein. A representative hardware layer 1104 is illustrated and can represent, for example, any of the above referenced computing devices. In some examples, the hardware layer 1104 may be implemented according to the architecture of the computer system of FIG. 11.

The representative hardware layer 1104 comprises one or more processing units 1106 having associated executable instructions 1108. Executable instructions 1108 represent the executable instructions of the software architecture 1102, including implementation of the methods, modules, subsystems, and components, and so forth described herein and may also include memory and/or storage modules 1110, which also have executable instructions 1108. Hardware layer 1104 may also comprise other hardware as indicated by other hardware 1112 which represents any other hardware of the hardware layer 1104, such as the other hardware illustrated as part of the software architecture 1102.

In the example architecture of FIG. 11, the software architecture 1102 may be conceptualized as a stack of layers where each layer provides particular functionality. For example, the software architecture 1102 may include layers such as an operating system 1114, libraries 1116, frameworks/middleware 1118, applications 1120, and presentation layer 1144. Operationally, the applications 1120 and/or other components within the layers may invoke application programming interface (API) calls 1124 through the software stack and access a response, returned values, and so forth illustrated as messages 1126 in response to the API calls 1124. The layers illustrated are representative in nature and not all software architectures have all layers. For example, some mobile or special purpose operating systems may not provide a frameworks/middleware 1118 layer, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. In some examples, the services 1130 include an interrupt service. The interrupt service may detect the receipt of an interrupt and, in response, cause the software architecture 1102 to pause its current processing and execute an interrupt service routine (ISR) when an interrupt is accessed.

The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than to interface directly with the underlying operating system 1114 functionality (e.g., kernel 1128, services 1130 and/or drivers 1132). The libraries 1116 may include system libraries 1134 (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks/middleware 1118 may provide a higher-level common infrastructure that may be utilized by the applications 1120 and/or other software components/modules. For example, the frameworks/middleware 1118 may provide various graphic user interface (GUI) functions, high-level resource management, high-level location services, and so forth. The frameworks/middleware 1118 may provide a broad spectrum of other APIs that may be utilized by the applications 1120 and/or other software components/modules, some of which may be specific to a particular operating system or platform.

The applications 1120 include built-in applications 1140 and/or third-party applications 1142. Examples of representative built-in applications 1140 may include, but are not limited to, a contacts application, a browser application, a book reader application, a location application, a media application, a messaging application, and/or a game application. Third-party applications 1142 may include any of the built-in applications as well as a broad assortment of other applications. In a specific example, the third-party application 1142 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1142 may invoke the API calls 1124 provided by the mobile operating system such as operating system 1114 to facilitate functionality described herein.

The applications 1120 may utilize built-in operating system functions (e.g., kernel 1128, services 1130 and/or drivers 1132), libraries (e.g., system libraries 1134, API libraries 1136, and other libraries 1138), and frameworks/middleware 1118 to create user interfaces to interact with users of the system. Alternatively, or additionally, in some systems, interactions with a user may occur through a presentation layer, such as presentation layer 1144. In these systems, the application/module "logic" can be separated from the aspects of the application/module that interact with a user.

Some software architectures utilize virtual machines. In the example of FIG. 11, this is illustrated by virtual machine 1148. A virtual machine creates a software environment where applications/modules can execute as if they were executing on a hardware computing device. A virtual machine is hosted by a host operating system (operating system 1114) and typically, although not always, has a virtual machine monitor 1146, which manages the operation of the virtual machine 1148 as well as the interface with the host operating system (i.e., operating system 1114). A software architecture executes within the virtual machine 1148 such as an operating system 1150, libraries 1152, frameworks/middleware 1154, applications 1156 and/or presentation layer 1158. These layers of software architecture executing within the virtual machine 1148 can be the same as corresponding layers previously described or may be different.

Modules, Components and Logic

A computer system may include logic, components, modules, mechanisms, or any suitable combination thereof. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. One or more computer systems (e.g., a standalone, client, or server computer system) or one or more hardware processors may be configured by software (e.g., an application or application portion) as a hardware-implemented module that operates to perform certain operations as described herein.

A hardware-implemented module may be implemented mechanically or electronically. For example, a hardware-implemented module may comprise dedicated circuitry or logic that is permanently configured (e.g., as a special-purpose processor, such as a field programmable gate array [FPGA] or an application-specific integrated circuit [ASIC]) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Hardware-implemented modules may be temporarily configured (e.g., programmed), and each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses that connect the hardware-implemented modules). Multiple hardware-implemented modules are configured or instantiated at different times. Communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. The processor or processors may be located in a single location (e.g., within a home environment, an office environment, or a server farm), or the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

The systems and methods described herein may be implemented using digital electronic circuitry, computer hardware, firmware, software, a computer program product (e.g., a computer program tangibly embodied in an information carrier, e.g., in a machine-readable medium for execution by, or to control the operation of, data processing apparatus, e.g., a programmable processor, a computer, or multiple computers), or any suitable combination thereof.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites (e.g., cloud computing) and interconnected by a communication network. In cloud computing, the server-side functionality may be distributed across multiple computers connected by a network. Load balancers are used to distribute work between the multiple computers. Thus, a cloud computing environment performing a method is a system comprising the multiple processors of the multiple computers tasked with performing the operations of the method.

Operations may be performed by one or more programmable processors executing a computer program to perform functions by operating on input data and generating output. Method operations can also be performed by, and apparatus of systems may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. A programmable computing system may be deployed using hardware architecture, software architecture, or both. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out example hardware (e.g., machine) and software architectures that may be deployed.

Example Machine Architecture and Machine-Readable Medium

Figure 12:
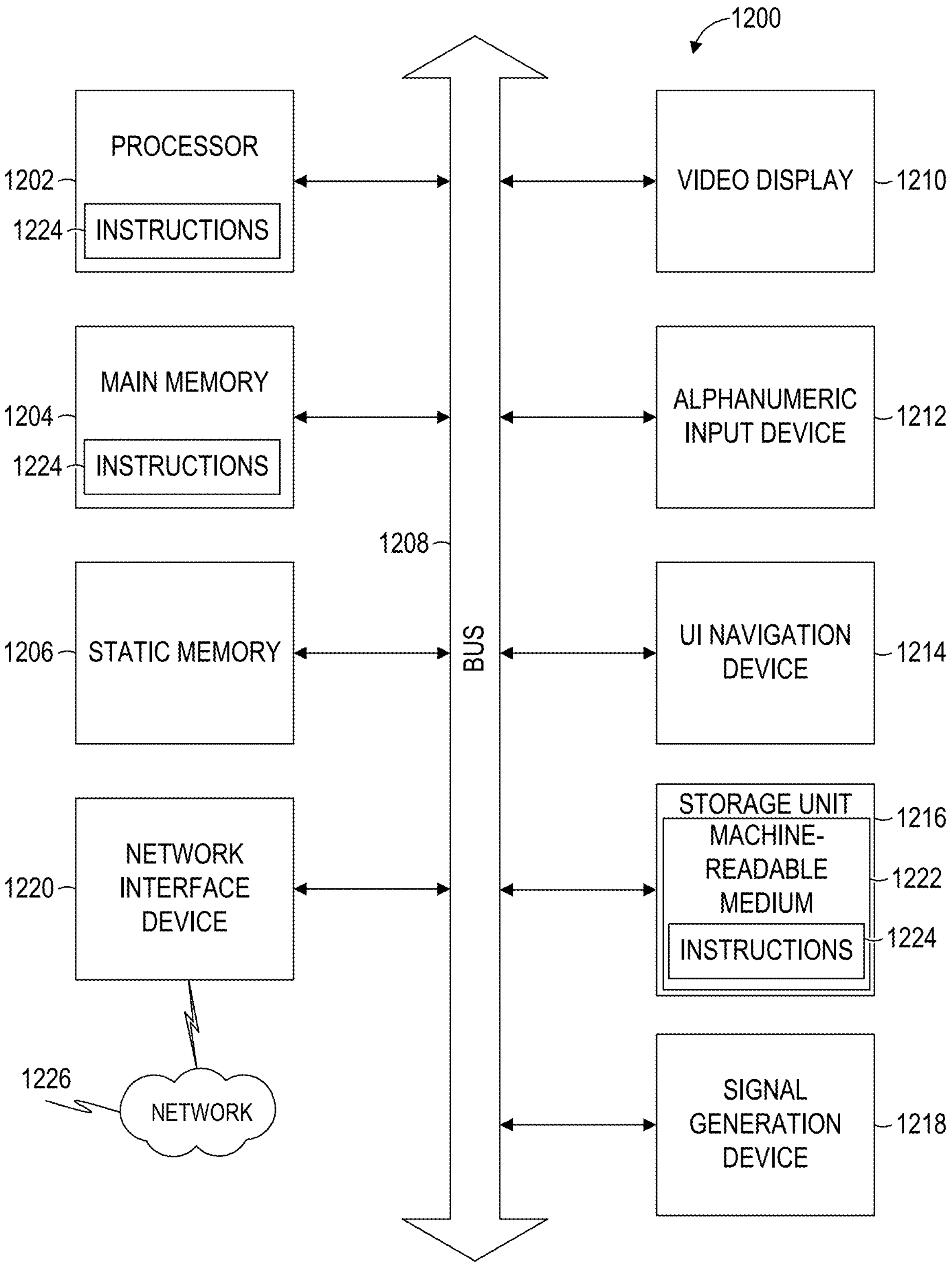
FIG. 12 shows a block diagram of a machine in the example form of a computer system within which instructions may be executed for causing the machine to perform any one or more of the methodologies discussed herein.

FIG. 12 shows a block diagram of a machine in the example form of a computer system 1200 within which instructions 1224 may be executed for causing the machine to perform any one or more of the methodologies discussed herein. The machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU), or both), a main memory 1204, and a static memory 1206, which communicate with each other via a bus 1208. The computer system 1200 may further include a video display unit 1210 (e.g., a liquid crystal display (LCD) or a cathode ray tube [CRT]). The computer system 1200 also includes an alphanumeric input device 1212 (e.g., a keyboard or a touch-sensitive display screen), a user interface (UI) navigation (or cursor control) device 1214 (e.g., a mouse), a storage unit 1216, a signal generation device 1218 (e.g., a speaker), and a network interface device 1220.

Machine-Readable Medium

The storage unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, with the main memory 1204 and the processor 1202 also constituting a machine-readable medium 1222.

While the machine-readable medium 1222 is shown in FIG. 12 to be a single medium, the term "machine-readable medium" may include a single medium or multiple media (e.g., a centralized or distributed database, and/or associated caches and servers) that store the one or more instructions 1224 or data structures. The term "machine-readable medium" shall also be taken to include any tangible medium that is capable of storing, encoding, or carrying instructions 1224 for execution by the machine and that cause the machine to perform any one or more of the methodologies of the present disclosure, or that is capable of storing, encoding, or carrying data structures utilized by or associated with the instructions 1224. The term "machine-readable medium" shall accordingly be taken to include, but not be limited to, solid-state memories, and optical and magnetic media. Specific examples of machine-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

Transmission Medium

The instructions 1224 may further be transmitted or received over a communications network 1226 using a transmission medium. The instructions 1224 may be transmitted using the network interface device 1220 and any one of a number of well-known transfer protocols (e.g., hypertext transport protocol [HTTP]). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1224 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A system for generating recommendations, the system comprising:

a memory that stores instructions; and one or more processors coupled to the memory and configured to execute the instructions to perform operations comprising:

accessing a tree structure comprising a plurality of nodes, each leaf node of the tree structure representing an item from a catalog comprising a plurality of items, each non-leaf node of the tree structure representing a cluster of items;

generating a first prompt for a large language model (LLM) based on child nodes of a root node of the tree structure;

receiving, from the LLM and in response to the first prompt, a recommended node selected from the child nodes of the root node;

generating a subsequent prompt for the LLM based on child nodes of the recommended node;

receiving, from the LLM and in response to the subsequent prompt, an updated recommended node selected from the child nodes of the recommended node;

repeating the generating a subsequent prompt based on child nodes of the recommended node and receiving an updated recommended node until the recommended node is a leaf node; and providing the item represented by the recommended leaf node as a recommended item.

2. The system of claim 1, wherein the operations further comprise generating the tree structure, the generating of the tree structure comprising:

extracting, for each item in the catalog, metadata for the item;

converting, for each item in the catalog, the metadata for the item to a vector representation;

based on the vector representations, clustering the items using hierarchical clustering; and generating the tree structure based on the hierarchical clustering.

3. The system of claim 2, wherein the generating of the tree structure further comprises:

assigning, for each item in the catalog, the metadata for the item as a description of the leaf node created for the item; and for each non-leaf node in the tree structure:

generating a prompt for the LLM that instructs the LLM to summarize the child nodes of the non-leaf node;

receiving, from the LLM and in response to the prompt, an output comprising a summary of the non-leaf node; and assigning, to the node, the summary of the node as a description of the non-leaf node.

4. The system of claim 2, wherein the plurality of items exceeds a size limit for input to the LLM.

5. The system of claim 1, wherein the generating of the first prompt is further based on a user interest.

6. The system of claim 1, wherein the generating of the first prompt is further based on a user query.

7. The system of claim 1, wherein the generating of the first prompt is further based on a user's past interactions.

8. A non-transitory computer-readable medium that stores instructions that, when executed by one or more processors, cause the one or more processors to perform operations comprising:

accessing a tree structure comprising a plurality of nodes, each leaf node of the tree structure representing an item from a catalog comprising a plurality of items, each non-leaf node of the tree structure representing a cluster of items;

generating a first prompt for a large language model (LLM) based on child nodes of a root node of the tree structure;

receiving, from the LLM and in response to the first prompt, a recommended node selected from the child nodes of the root node;

generating a subsequent prompt for the LLM based on child nodes of the recommended node;

repeating the generating a subsequent prompt based on child nodes of the recommended node and receiving an updated recommended node until the recommended node is a leaf node; and providing the item represented by the recommended leaf node as a recommended item.

9. The non-transitory computer-readable medium of claim 8, wherein the operations further comprise generating the tree structure, the generating of the tree structure comprising:

extracting, for each item in the catalog, metadata for the item;

converting, for each item in the catalog, the metadata for the item to a vector representation;

based on the vector representations, clustering the items using hierarchical clustering; and generating the tree structure based on the hierarchical clustering.

10. The non-transitory computer-readable medium of claim 9, wherein the generating of the tree structure further comprises:

assigning, for each item in the catalog, the metadata for the item as a description of the leaf node created for the item; and for each non-leaf node in the tree structure:

generating a prompt for the LLM that instructs the LLM to summarize the child nodes of the non-leaf node;

receiving, from the LLM and in response to the prompt, an output comprising a summary of the non-leaf node; and assigning, to the node, the summary of the node as a description of the non-leaf node.

11. The non-transitory computer-readable medium of claim 9, wherein the plurality of items exceeds a size limit for input to the LLM.

12. The non-transitory computer-readable medium of claim 8, wherein the generating of the first prompt is further based on a user interest.

13. The non-transitory computer-readable medium of claim 8, wherein the generating of the first prompt is further based on a user query.

14. The non-transitory computer-readable medium of claim 8, wherein the generating of the first prompt is further based on a user's past interactions.

15. A method comprising:

accessing, by one or more processors, a tree structure comprising a plurality of nodes, each leaf node of the tree structure representing an item from a catalog comprising a plurality of items, each non-leaf node of the tree structure representing a cluster of items;

generating a first prompt for a large language model (LLM) based on child nodes of a root node of the tree structure;

receiving, from the LLM and in response to the first prompt, a recommended node selected from the child nodes of the root node;

generating a subsequent prompt for the LLM based on child nodes of the recommended node;

repeating the generating a subsequent prompt based on child nodes of the recommended node and receiving an updated recommended node until the recommended node is a leaf node; and providing the item represented by the recommended leaf node as a recommended item.

16. The method of claim 15, further comprising generating the tree structure, the generating of the tree structure comprising:

extracting, for each item in the catalog, metadata for the item;

converting, for each item in the catalog, the metadata for the item to a vector representation;

based on the vector representations, clustering the items using hierarchical clustering; and generating the tree structure based on the hierarchical clustering.

17. The method of claim 16, wherein the generating of the tree structure further comprises:

assigning, for each item in the catalog, the metadata for the item as a description of the leaf node created for the item; and for each non-leaf node in the tree structure:

generating a prompt for the LLM that instructs the LLM to summarize the child nodes of the non-leaf node;

receiving, from the LLM and in response to the prompt, an output comprising a summary of the non-leaf node; and assigning, to the node, the summary of the node as a description of the non-leaf node.

18. The method of claim 16, wherein the plurality of items exceeds a size limit for input to the LLM.

19. The method of claim 15, wherein the generating of the first prompt is further based on a user interest.

20. The method of claim 15, wherein the generating of the first prompt is further based on a user query.

* * * * *